Nov. 22, 1938.  F. G. WELKE  2,137,660
BEARING WASHER
Filed July 17, 1937
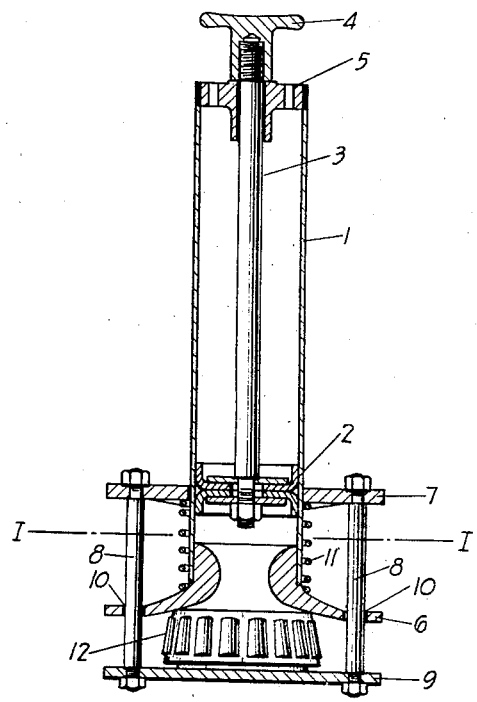
FIG-I
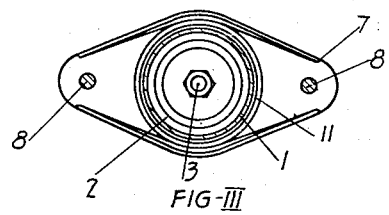
FIG-III
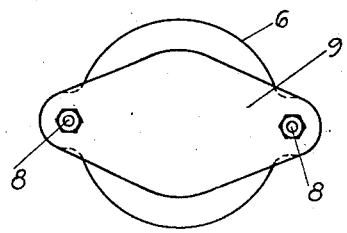
FIG-II
Inventor: Ferdinand G. Welke
By His Attorney H. Birch Patented Nov. 22, 1938

2,137,660

UNITED STATES PATENT OFFICE 2,137,660

BEARING WASHER

Ferdinand G. Welke, San Francisco, Calif., assignor to Shell Development Company, San Francisco, Calif., a corporation of Delaware Application July 17, 1937, Serial No. 154,242

1 Claim. (Cl. 141—1)

This invention relates to a manually operated bearing washer and is particularly concerned with bearings of the roller or ball type as fitted to the wheels of automobiles, trucks, tractors and to various other parts of these units and other mechanisms.

In order to provide sufficient lubrication of these bearings it is a practice to surround the bearing with a viscous oil or grease. After some time of operation the viscous oil or grease surrounding the rollers or balls, as the case may be, becomes either oxidized, too viscous or full of small metallic particles so that it is desirable for further efficient operation to remove the lubricant from the interstices between the rollers or balls and replace same with fresh lubricant.

In the past the removal of the lubricant has been attempted by passing the bearing to and fro in a bucket or other container of a hydrocarbon solvent such as gasoline, naphtha or kerosene. However, this procedure is only partially effective in removing all the lubricant and furthermore is cumbersome and necessitates the operator placing his hands in the solvent, which in time causes them to become rough, chapped and sore, owing to the solvent removing the natural oil from the skin.

It is therefore an object of this invention to devise a simple bearing washer which will remove the lubricant from the bearing in a speedy and effective manner.

The further objects of this invention will be apparent to those skilled in the art from the following detailed description thereof throughout which reference is made to the accompanying drawing, of which:

Figure I is a sectional elevation of the washer with a roller bearing in place.

Figure II is a bottom view of the washer.

Figure III is a sectional plan view through I—I of Figure I.

Referring to these figures, it will be seen, that the washer comprises a cylindrical barrel 1, having therein a piston 2 mounted on a piston rod 3 and terminating in a knob 4, a cap 5 provides a bearing for the piston rod at the upper end of the barrel 1. Permanently attached to the lower end of the barrel is a hollow cone-shaped member 6. Slidably mounted on the barrel 1 is a collar 7 having two rods 8 which act as distance pieces attaching said collar to a bottom plate 9. The rods 8 freely pass through openings 10 in the outer wall of said cone-shaped member 6. A spring 11 interposed between said cone-shaped member 6 and the collar 7 normally keeps the bottom of said cone 6 in contact with plate 9. However, by holding the barrel 1 in one hand and pressing the collar 7 down with the other, a gap may be formed between the cone 6 and the bottom plate 9 into which a bearing such as 12 may be placed. The spring 11 then serves to keep said bearing firmly in place between the plate 9 and cone 6. Having so placed a bearing to be washed in the device, the unit is lowered into a container of suitable solvent such as gasoline, kerosene or naphtha and several strokes given manually to the piston 2 by means of the knob 4. By this movement, solvent is rapidly forced through the interstices between the rollers of the bearing 12 removing all lubricant therefrom. The unit is then removed from the solvent and the bearing released from between the cone 6 and plate 9 by forcing the same sidewise or by relieving the tension of the spring against the collar 7 by forcing the same further down the barrel 1.

The bearing after drying is then ready for the application of fresh lubricant, as for example, can be readily applied by means of the device shown in my application Serial No. 112,245, filed November 23, 1936.

I claim as my invention:

A portable bearing cleaner comprising a hand pump having a cylinder, and a piston therein, a hollow cone-shaped member attached to one end of said cylinder and in communication therewith, a collar slidably mounted on said cylinder, spring means normally holding said collar and said cone shaped member apart, a plate opposite the outer face of said cone-shaped member, and distance pieces slidably connected to said cone-shaped member connecting said collar and plate in spaced relationship.

FERDINAND G. WELKE.